US008964567B2

(12) United States Patent
Glozman et al.

(10) Patent No.: US 8,964,567 B2
(45) Date of Patent: Feb. 24, 2015

(54) WIRELESS SYNCHRONIZATION TESTING

(75) Inventors: Pasha Glozman, Bellevue, WA (US); Kiran Vadde, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 13/188,227

(22) Filed: Jul. 21, 2011

(65) Prior Publication Data

US 2013/0021911 A1 Jan. 24, 2013

(51) Int. Cl.
*H04B 17/00* (2006.01)
*H04L 12/26* (2006.01)
*H04W 24/06* (2009.01)
*H04W 56/00* (2009.01)
*H04W 76/02* (2009.01)

(52) U.S. Cl.
CPC .............. *H04W 24/06* (2013.01); *H04W 56/00* (2013.01); *H04W 76/023* (2013.01)
USPC ............................ 370/241; 370/324; 370/341

(58) Field of Classification Search
USPC ......... 370/241, 304, 305, 503–520, 322, 324, 370/328–330, 335–338, 341–343, 345–350, 370/441–442, 445, 447
See application file for complete search history.

(56) References Cited

U.S. PATENT DOCUMENTS

| 7,000,032 | B2 | 2/2006 | Kloba et al. | |
|---|---|---|---|---|
| 7,519,954 | B1 * | 4/2009 | Beddoe et al. | ................ 717/124 |
| 7,573,905 | B2 | 8/2009 | Benedyk et al. | |
| 7,689,510 | B2 | 3/2010 | Lamkin et al. | |
| 7,725,566 | B2 | 5/2010 | Stirbu | |
| 7,830,826 | B2 | 11/2010 | Costa-Requena et al. | |
| 2002/0046296 | A1 * | 4/2002 | Kloba et al. | .................. 709/248 |
| 2002/0080024 | A1 * | 6/2002 | Nelson et al. | ................. 340/503 |
| 2002/0159416 | A1 * | 10/2002 | Kazmi et al. | .................. 370/335 |
| 2005/0265341 | A1 * | 12/2005 | Benedyk et al. | .............. 370/389 |
| 2006/0002306 | A1 * | 1/2006 | Brown et al. | ................... 370/241 |
| 2006/0002320 | A1 * | 1/2006 | Costa-Requena et al. | .... 370/312 |
| 2006/0161635 | A1 * | 7/2006 | Lamkin et al. | ................. 709/217 |
| 2006/0215652 | A1 * | 9/2006 | Strandridge et al. | .......... 370/389 |
| 2006/0227811 | A1 * | 10/2006 | Hussain et al. | ............... 370/503 |
| 2007/0150552 | A1 * | 6/2007 | Harris et al. | ................... 709/218 |
| 2007/0244578 | A1 * | 10/2007 | Stirbu | ............................ 700/65 |

(Continued)

OTHER PUBLICATIONS

Presser, et al., "UPnP™ Device Architecture 1.1", Retrieved at <<http://www.upnp.org/specs/arch/UPnP-arch-DeviceArchitecture-v1.1.pdf>>, Oct. 15, 2008, pp. 136.

*Primary Examiner* — Andrew Lai
*Assistant Examiner* — John Lequang
(74) *Attorney, Agent, or Firm* — Ladislav Kusnyer; Judy Yee; Micky Minhas

(57) ABSTRACT

A testing sequence is disclosed for testing a wireless media synchronization connection between a computing device and a mobile device. A first test message comprising a first test ID may be sent from a computing device to a mobile device over a test communication channel. The computing device may then receive from the mobile device one or more packets containing a second test ID and an indication of a wireless synchronization protocol over a wireless synchronization channel. If a connection is established with the mobile device using the wireless synchronization protocol, a second test message may be sent to the mobile device using the wireless synchronization protocol, and the mobile device may be monitored by the computing device over the test communication channel for reception of the second test message.

18 Claims, 3 Drawing Sheets

(56) References Cited

U.S. PATENT DOCUMENTS

| | | | |
|---|---|---|---|
| 2008/0008114 A1* | 1/2008 | Kaarela et al. | 370/328 |
| 2008/0126145 A1* | 5/2008 | Rackley, III et al. | 705/7 |
| 2009/0274121 A1* | 11/2009 | Bertorelle et al. | 370/331 |
| 2010/0113011 A1* | 5/2010 | Gregg et al. | 455/425 |
| 2010/0115074 A1* | 5/2010 | Tapiola | 709/223 |
| 2010/0188991 A1* | 7/2010 | Raleigh | 370/252 |
| 2012/0051224 A1* | 3/2012 | Olgaard et al. | 370/241 |
| 2012/0123723 A1* | 5/2012 | El-Hassan et al. | 702/108 |

* cited by examiner

WIRELESS SYNCHRONIZATION TESTING

BACKGROUND

Universal plug and play discovery and connectivity protocols over local wireless networks may be used to establish media transfer protocol. synchronization connections from computing devices to mobile devices. However, these synchronizations are complex and a large amount of factors are involved in establishing the connectivity and carrying out the synchronization. As a result, identifying error in failed synchronizations can be difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter, Furthermore, the claimed subject matter is not limited to implementations that solve any or all disadvantages noted in any part of this disclosure.

A wireless media synchronization connection may be tested between a computing device and a mobile device. A first test message comprising a first test ID may be sent from a computing device to a mobile device over a test communication channel. The computing device may then receive from the mobile device over a wireless synchronization channel one or more packets containing a second test ID and an indication of a wireless synchronization protocol. If a connection is established with the mobile device using the wireless synchronization protocol, a second test message may be sent to the mobile device using the wireless synchronization protocol, and the mobile device may be monitored by the computing device over the test communication channel for reception of the second test message.

DETAILED DESCRIPTION

The synchronization of media between a computing device and a mobile device may be conducted using a wireless connection. The use of the wireless connection can add uncertainty when attempting to diagnose the cause of failed synchronizations. For example, it may be difficult to determine if a failed synchronization is due to a wireless router designed for Internet connections rather than multi-cast protocols, or due to a firewall blocking a port.

In order to facilitate the diagnosis of potential synchronization errors due to the wireless connectivity, the computing device and mobile device may undergo a testing sequence in which the devices are connected by both a reliable test communication channel (e.g., universal serial bus) and a wireless synchronization channel, Unique test messages, designed to avoid collision with other wireless messages on the network, may be sent over both connections, and the test communication channel may be used to monitor the reception of test messages over the wireless network.

Figure 1:
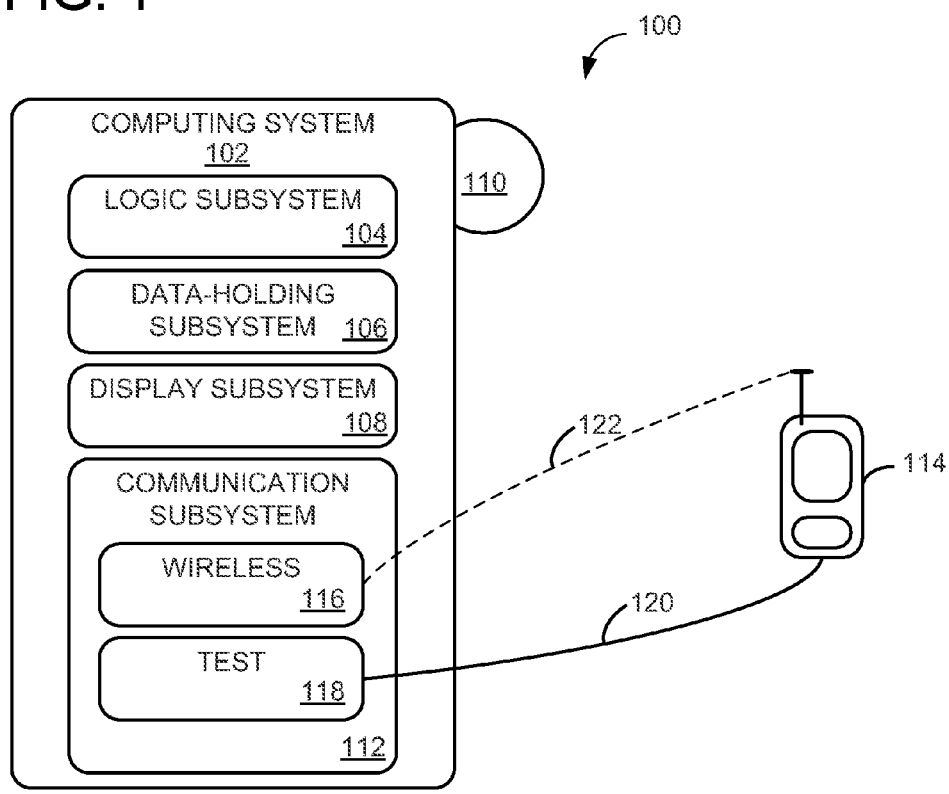
FIG. 1 schematically shows a synchronization environment according to an embodiment of the present disclosure.

Turning to FIG. 1, an example synchronization environment 100 is depicted. Synchronization environment 100 may include computing system 102 and mobile device 114. Computing system 102 may be configured to synchronize media to mobile device 114 using standard media transfer protocols, and vice versa. Computing system 102 includes logic subsystem 104 and data-holding subsystem 106. Data-holding subsystem 106 may hold instructions executable by logic subsystem 104 to carry out the testing sequence as described herein. Computing system 102 may also include display subsystem 108 for displaying error messages output to a user, for example, and removable computer-readable storage media 110. Additional detail on data-holding subsystem 106, logic subsystem 104, display subsystem 108, and removable computer-readable storage media 110 will be described below.

Computing system 102 also includes communication subsystem 112. Communication subsystem 112 may be configured to communicatively couple computing system 102 with one or more other computing devices, such as mobile device 114. Communication subsystem 112 may include wired and/or wireless communication modules compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 102 to send and/or receive messages to and/or from other devices via a network such as the Internet.

In the embodiment depicted in FIG, 1, communication subsystem 112 includes a test communication module 118 configured to send and receive information via a test communication channel 120. Communication subsystem 112 also includes a wireless synchronization module 116 configured to send and receive information via a wireless synchronization channel 122. Both the test communication module and the wireless synchronization module are configured to communicate with mobile device 114.

The test communication module 118 may be configured to provide an established one-to-one connection between the computing system 102 and mobile device 114. In some embodiments, test communication module 118 may include a wired bus, such as a universal serial bus or an IEEE 1394 bus. In some embodiments, the test communication module 118 may include a wireless bus configured to establish a reliable one-to-one connection, such as a BLUETOOTH™ bus.

Wireless synchronization module 116 may be configured to provide a wireless connection between the computing system 102 and mobile device 114, Wireless synchronization channel 122 may be any suitable wireless connection that supports media transfer protocols between the computing system 102 and mobile device 114. In some embodiments, wireless synchronization module 116 may be configured to establish a wireless local area network connection, such as an IEEE 802.11.x connection. Wireless synchronization module 116 may be configured to establish a connection between computing system 102 and mobile device 114 via one or more devices (not shown), such as network routers, or may be configured to establish a direct connection to mobile device 114.

Mobile device 114 may be any computing device enabled to connect to a computing device over a compatible wireless connection and configured to run media transfer protocols, including but not limited to mobile phones, smart phones, television set top boxes, laptop computers, portable media devices, etc. Mobile device 114 includes a data-holding subsystem holding instructions executable by a logic subsystem for carrying out portions of the testing sequence as described below.

Figure 2:
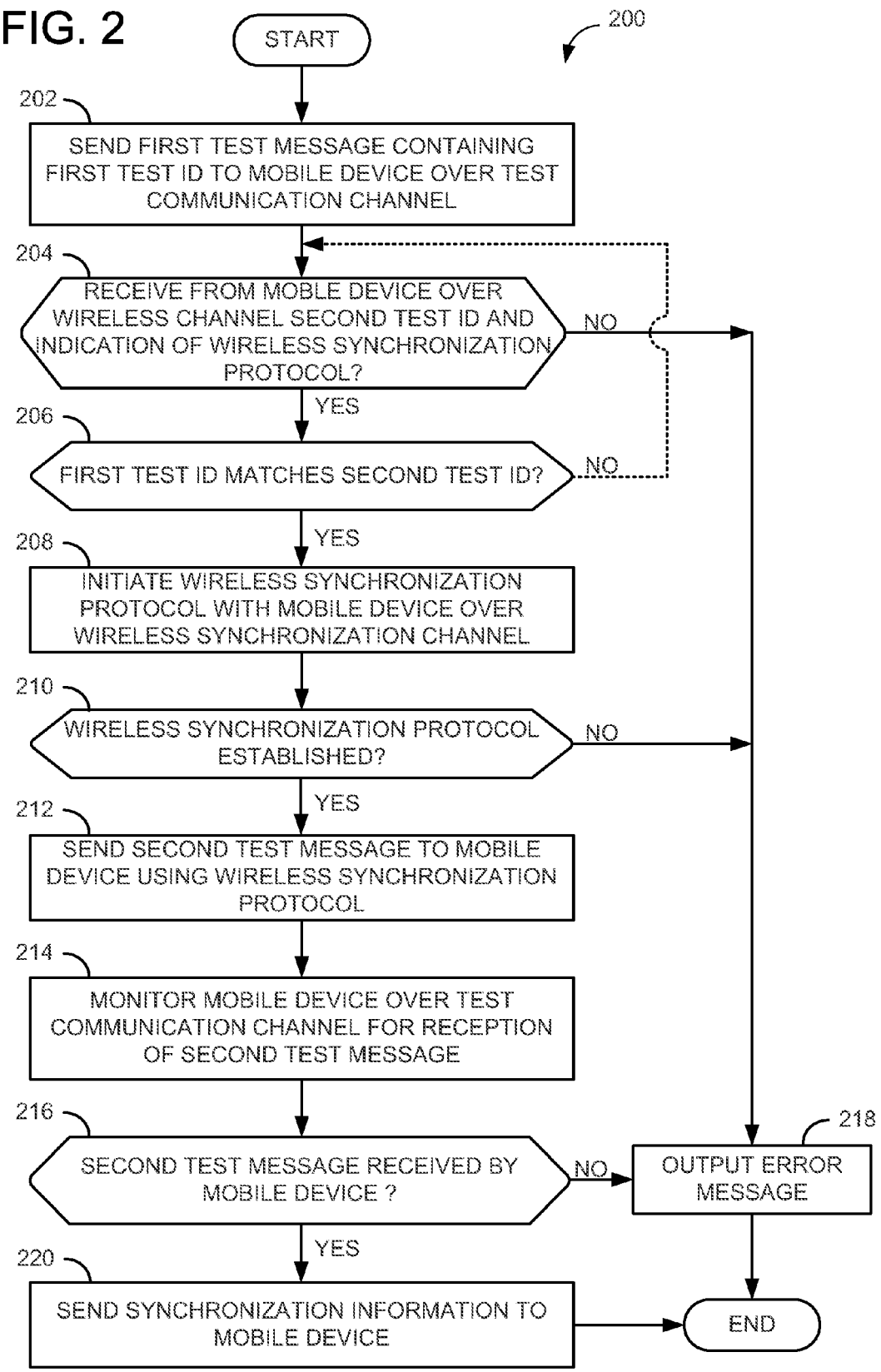
FIG. 2 is a flow chart illustrating an example method for testing a synchronization connection.

FIG. 2 is a flow chart illustrating a method 200 of testing a wireless synchronization connection in accordance with an embodiment of the present disclosure. Method 200 may be carried out by computing system 102, with instructions stored on data-holding subsystem 106 and executed by logic subsystem 104. Method 200 initiates the testing sequence, at 202, by sending a first test message containing a first test ID to a mobile device over a test communication channel. When a mobile device, such as mobile device 114, is connected to a computing device, such as computing system 102, the testing sequence may be initiated. In one embodiment, the testing sequence may be initiated in response to the computing device and mobile device being connected for the first time. In other embodiments, the testing sequence may be initiated in response to a user command, in response to a detection of a new network configuration, or in response to any suitable trigger.

The first test message is sent from the computing device to the mobile device over a test communication channel, such as test channel. 120, and includes a first test ID. The first test ID may be a random DWORD used as a test cookie to avoid contention with any other tests that may be happening between the devices.

Method 200 proceeds to 204 to determine if a second test ID and indication of a wireless synchronization protocol are received from the mobile device over a wireless synchronization. channel, such as wireless channel 122. The test message sent to the mobile device at 202 may be received at the mobile device, and in return, the mobile device may send a second test ID to the computing device. Additionally, the mobile device may send an indication of a wireless synchronization protocol to the computing device. The indication of a wireless synchronization protocol may contain information to facilitate initiation of the protocol with which future synchronizations may take place. This information is accompanied by a purposefully malformed header as a mechanism for ensuring the testing information sent to and received from the mobile device is not used by other devices or tests occurring on the network, The indication of the wireless synchronization protocol will be discussed in more detail below. In one embodiment, the second test ID and indication of a wireless synchronization protocol sent from the mobile device may be sent in the form of simple service discovery protocol (SSDP) and/or user datagram protocol (UDP) packets, Any suitable mechanism of sending the information to the computing device may be used.

If the second test ID and indication of a wireless synchronization protocol are not received at the computing device, method 200 proceeds to 218 to output an error message. The computing device may be configured to have a time-out for waiting for the reception of the second test ID after sending the first test ID. That is, the computing device may output an error message if the second test ID is not received within a predetermined amount of time. In some embodiments, the error message may be output for display on the computing device.

If the second test ID and indication of a wireless synchronization protocol are received at the computing device, method 200 proceeds to 206 to determine if the second test ID matches the first test ID. The second test ID may be the same DWORD as the first test ID, and may be used to verify that the information the computing device is receiving from the mobile device is part of the testing sequence, and not intended for some other use. If the second test ID does not match the first test ID, method 200 may return to 204 to continue to monitor for reception of the matching test ID.

If the second test ID does match the first test ID, method 200 proceeds to 208 to initiate the wireless synchronization protocol with the mobile device over the wireless synchronization channel. The wireless synchronization protocol may be initiated based on information received from the mobile device, For example, at 204, an indication of a wireless synchronization protocol may be received at the computing device from the mobile device. The indication of a wireless synchronization protocol may include an IP address and port number, for example, that the computing device can utilize to initiate a TCP/IP connection. In other embodiments, other communication protocols may be used to carry out the wireless synchronization, such as stream control transmission protocol (SCTP), or any suitable wireless communication protocol.

At 210, it is determined if the connection is established with the mobile device using the wireless synchronization protocol. The determination may be made by any suitable mechanism, such as receiving an acknowledgement from the mobile device. If it is determined at 210 that the connection with the mobile device using the wireless synchronization protocol is not established, such as if an acknowledgement is not received within a predetermined amount of time, method 200 proceeds to 218 to output an error message. If it is determined that the connection using the wireless synchronization protocol is established, method 200 proceeds to 212.

At 212, a second test message is sent to the mobile device over the wireless synchronization channel using the wireless synchronization protocol. The second test message contains a test ID, which in some embodiments is the same as the first test ID. At 214, the computing device monitors the mobile device over the test communication channel for reception of the second test message. Upon reception of the second test message, the mobile device is configured to send a "success" message to the computing device over the test communication channel, and at 214, the computing device is waiting for reception of this message.

At 216, it is determined if the second test message is received by the mobile device. If the message is not received within a predetermined amount of time, method 200 proceeds to 218 to output an error message. If the second test message is received by the mobile device, and the test success message is sent to the computing device, synchronization information may be sent to the mobile device at 220. The synchronization information may include any protocol and/or device information that can be used to form a reliable wireless connection between the computing device and the mobile device as confirmed by the testing sequence.

Thus, method 200 provides for a testing sequence to ensure a wireless synchronization connection between a computing device and a mobile device prior to synchronization of media. The testing sequence simulates universal plug and play announcement, discovery, connection, and communication, carried out over a wireless synchronization channel, and initiated and monitored over a test communication channel, Further, method 200 provides for a testing sequence in which the computing device and mobile device are connected over the two channels simultaneously. Error at any of the processes of the testing sequence may result in the output of an error message that may include an indication of the particular part of the testing procedure that caused the test to fail. In some embodiments, the error message may include recommended solutions that may be utilized by a user to correct network settings and establish a reliable wireless connection for future synchronizations. Such error messages may be presented to a user and/or sent to other system modules for automatic error resolution.

Figure 3:
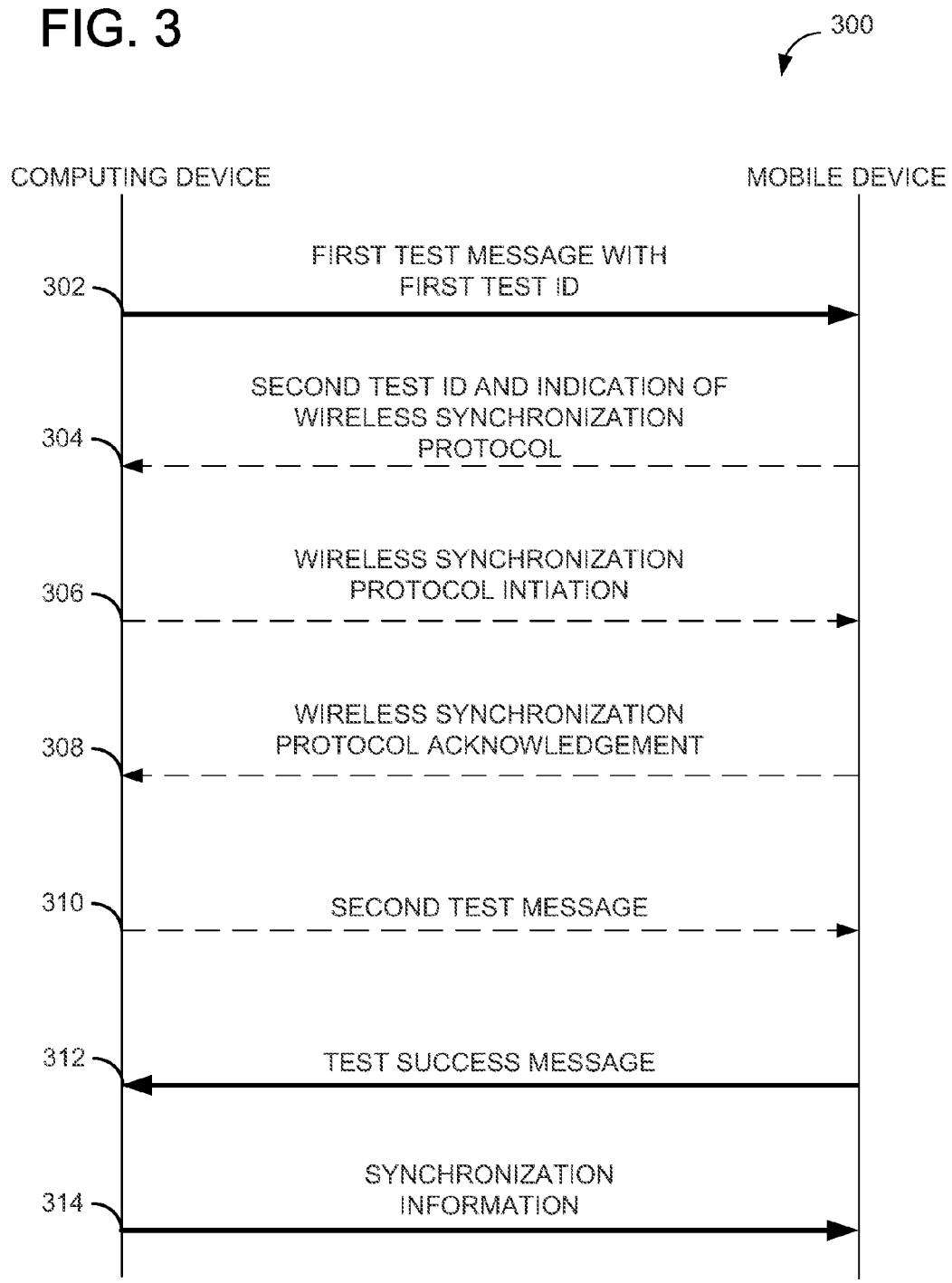
FIG. 3 is a diagram illustrating a successful. testing sequence according to an embodiment of the present disclosure.

FIG. 3 is a diagram illustrating a successful testing sequence 300 according to an embodiment of the present disclosure. Testing sequence 300 may be carried out according to method 200 described with respect to FIG. 2. The flow of testing information between the computing device and mobile device over the test communication channel is depicted by solid lines, while the flow of testing information over the wireless synchronization channel is depicted by dashed lines. Testing sequence 300 includes, at 302, sending a first test message including a first test ID over the test communication channel from the computing device to the mobile device. At 304, upon receiving the first test message, the mobile device sends a message containing a second test ID and an indication of a wireless synchronization protocol to the computing device over the wireless synchronization channel.

When the computing device receives the second test ID and indication of a wireless synchronization protocol, it tests the second test ID to validate that it matches the first test ID. Then the computing device, at 306, initiates the wireless synchronization protocol with the mobile device over the wireless synchronization channel using the information received from the mobile device. The mobile device sends an acknowledgement to the computing device at 308 that the wireless synchronization protocol over the wireless synchronization channel is established. The computing device then sends a second test message to the mobile device over the wireless synchronization channel using the wireless synchronization protocol at 310. Upon receiving the second test message, the mobile device sends a test success message at 312 to the computing device over the test communication channel.

Once the computing device has received the test success message, it may send synchronization information to the mobile device at 314 in order to initiate a synchronization or set up a future synchronization. While the synchronization information is shown being sent over the test communication channel, in other embodiments, the synchronization information may be sent over the wireless synchronization channel.

In some embodiments, the above described methods and processes may be tied to a computing system including one or more computers. In particular, the methods and processes described herein may be implemented as a computer application, computer service, computer API, computer library, and/or other computer program product.

FIG. 1 schematically shows a nonlimiting computing system 102 that may perform one or more of the above described methods and processes. Computing system 102 is shown in simplified form. It is to be understood that virtually any computer architecture may be used without departing from the scope of this disclosure. In different embodiments, computing system 102 may take the form of a mainframe computer, server computer, desktop computer, laptop computer, tablet computer, home entertainment computer, network computing device, mobile computing device, mobile communication device, gaming device, etc.

Computing system 102 includes a logic subsystem 104 and a data-holding subsystem 106. Computing system 102 may optionally include a display subsystem 108, communication subsystem 112, and/or other components not shown in FIG. 1. Computing system 102 may also optionally include user input devices such as keyboards, mice, game controllers, cameras, microphones, and/or touch screens, for example.

Logic subsystem 104 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 106 may include one or more physical, non-transitory, devices configured to hold data and/or instructions executable by the logic subsystem to implement the herein described methods and processes. When such methods and processes are implemented, the state of data-holding subsystem 106 may be transformed (e.g., to hold different data).

Data-holding subsystem 106 may include removable media and/or built-in devices. Data-holding subsystem 106 may include optical memory devices (e.g., CD, MD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 106 may include devices with one or more of the following characteristics: volatile, nonvolatile, dynamic, static, read/write, read-only, random access, sequential access, location addressable, file addressable, and content addressable. In some embodiments, logic subsystem 104 and data-holding subsystem 106 may be integrated into one or more common devices, such as an application specific integrated circuit or a system on a chip.

FIG. 1 also shows an aspect of the data-holding subsystem in the form of removable computer-readable storage media 110, which may be used to store and/or transfer data and/or instructions executable to implement the herein described methods and processes. Removable computer-readable storage media 110 may take the form of CDs, DVDs, HD-DVDs, Blu-Ray Discs, EEPROMs, and/or floppy disks, among others.

It is to be appreciated that data-holding subsystem 106 includes one or more physical, non-transitory devices. In contrast, in some embodiments aspects of the instructions described herein may be propagated in a transitory fashion by a pure signal an electromagnetic signal, an optical signal, etc.) that is not held by a physical device for at least a finite duration. Furthermore, data and/or other forms of information pertaining to the present disclosure may be propagated by a pure signal.

When included, display subsystem 108 may be used to present a visual representation of data held by data-holding subsystem 106. As the herein described methods and processes change the data held by the data-holding subsystem, and thus transform the state of the data-holding subsystem, the state of display subsystem 108 may likewise be transformed to visually represent changes in the underlying data.

Display subsystem 108 may include one or more display devices utilizing virtually any type of technology. Such display devices may be combined with logic subsystem 104 and/or data-holding subsystem 106 in a shared enclosure, or such display devices may be peripheral display devices.

As described above, the communication subsystem 112 may be configured to establish a wireless synchronization connection with another device. The communication subsystem may also establish a test connection that can be used as described above to help ensure that the wireless synchronization connection works properly. In addition to these communication functions, the communication subsystem may also be configured to connect to remote devices via a network such as the Internet. As such, computing system 102 may be able to send and/or receive information via the Internet or other suitable networks.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for establishing a synchronization connection between a computing device and a mobile device, the method comprising:
   sending a first test message from the computing device to a mobile device over a wired test communication channel; the first test message comprising a first test ID;
   at the computing device, receiving from the mobile device over a wireless synchronization channel a second test ID and an indication of a wireless synchronization protocol, the wired test communication channel being different than the wireless synchronization channel;
   when a connection with the mobile device is established using the wireless synchronization protocol:
      sending from the computing device a second test message to the mobile device using the wireless synchronization protocol over the wireless synchronization channel; and
      at the computing device, monitoring the mobile device over the wired test communication channel for reception of the second test message.

2. The method of claim 1, further comprising if a connection with the mobile device using the wireless synchronization protocol is not established within a predetermined amount of time, outputting an error message.

3. The method of claim 1, further comprising sending synchronization information to the mobile device in response to acknowledgement that the second test message has been received by the mobile device.

4. The method of claim 1, further comprising outputting an error message in response to not receiving an acknowledgement within a predetermined amount of time that the second test message has been received by the mobile device.

5. The method of claim 1, further comprising outputting an error message if the second test ID is not received within a predetermined amount of time.

6. The method of claim 1, wherein the test communication channel comprises a universal serial bus connection.

7. The method of claim 1, wherein the second test ID and the indication of the wireless synchronization protocol are accompanied by a malformed header, and wherein the indication of the wireless synchronization protocol comprises an IP address and a port number.

8. The method of claim 1, further comprising:
   in response to receiving the second test ID, testing the first test ID and the second test ID; and
   if the first test ID matches the second test ID, initiating the connection with the mobile device using the wireless synchronization protocol.

9. A computing device comprising a data-holding subsystem holding instructions executable by a logic subsystem to establish a synchronization connection between the computing device and a mobile device, the instructions executable to:
   send a test message containing a first test ID to the mobile device over a wired test communication channel;
   at the computing device, receive from the mobile device SSDP and UDP packets comprising a malformed header, a second test ID, an IP address, and a port number over a wireless synchronization channel, the wired test communication channel being different than the wireless synchronization channel;
   in response to receiving the SSDP and UDP packets, test the second test ID;
   if the second test ID matches the first test ID, then initiate a TCP/IP connection with the mobile device based on the IP address and the port number;
   when the TCP/IP connection is established:
      send a TCP/IP message containing the first test ID from the computing device to the mobile device over the TCP/IP connection; and
      at the computing device, monitor the mobile device over the wired test communication channel for reception of the TCP/IP message.

10. The computing device of claim 9, wherein the instructions are further executable to send synchronization information to the mobile device in response to acknowledgement that the TCP/IP message has been received by the mobile device.

11. The computing device of claim 9, wherein the instructions are further executable to output an error message in response to the SSDP and UDP packets not being received within a predetermined amount of time.

12. The computing device of claim 9, wherein the instructions are further executable to output an error message in response to not receiving acknowledgement within a predetermined amount of time that the TCP/IP message has been received by the mobile device.

13. The computing device of claim 9, wherein the instructions are further executable to output an error message in response to the TCP/IP connection with the mobile device not being established within a predetermined amount of time.

14. The computing device of claim 9, wherein the test communication channel comprises a universal serial bus connection.

15. a method for establishing a synchronization connection between a computing device and a mobile device, the method comprising:
   at the mobile computing device, receiving a first test message comprising a first test ID from a computing device over a wired test communication channel;
   in response to receiving the first test message, sending from the mobile computing device over a wireless synchronization channel a second test ID and an indication of a wireless synchronization protocol to the computing device, the wired test communication channel being different than the wireless synchronization channel;

when a connection with the computing device is established using the wireless synchronization protocol:
- receiving a second test message from the computing device using the wireless synchronization protocol over the wireless synchronization channel; and
- in response to receiving the second test message, sending from the mobile computing device a test success message to the computing device over the wired test communication channel.

16. The method of claim 15, wherein the second test ID and the indication of the wireless synchronization protocol are accompanied by a malformed header.

17. The method of claim 15, wherein the indication of the wireless synchronization protocol comprises an IP address and a port number.

18. The method of claim 15, wherein the test communication channel comprises a universal serial bus connection.

\* \* \* \* \*